United States Patent
Li (10) Patent No.: US 10,282,073 B2
(45) Date of Patent: May 7, 2019

(54) METHOD AND WIRELESS HANDHELD DEVICE FOR AUTOMATICALLY SWITCHING HANDHELD MODE

(71) Applicant: Huawei Device Co., Ltd., Dongguan (CN)

(72) Inventor: Hongxi Li, Beijing (CN)

(73) Assignee: HUAWEI DEVICE CO., LTD., Dongguan (CN)

( * ) Notice: Subject to any disclaimer, the term of this patent is extended or adjusted under 35 U.S.C. 154(b) by 348 days.

(21) Appl. No.: 14/522,060

(22) Filed: Oct. 23, 2014

(65) Prior Publication Data

US 2015/0042591 A1 Feb. 12, 2015

Related U.S. Application Data

(63) Continuation of application No. PCT/CN2013/074496, filed on Apr. 22, 2013.

(30) Foreign Application Priority Data

Apr. 23, 2012 (CN) .......................... 2012 1 0121940

(51) Int. Cl.
*G06F 3/041* (2006.01)
*G06F 3/0481* (2013.01)
(Continued)

(52) U.S. Cl.
CPC .......... *G06F 3/04845* (2013.01); *G06F 3/041* (2013.01); *G06F 3/0481* (2013.01);
(Continued)

(58) Field of Classification Search
CPC ...... G06F 3/0484; G06F 3/0488; G06F 3/041; G06F 3/04845; G06F 2200/1637;
(Continued)

(56) References Cited

U.S. PATENT DOCUMENTS

| 2004/0150635 | A1 | 8/2004 | Clapper | |
|---|---|---|---|---|
| 2005/0054392 | A1* | 3/2005 | Too et al. | ................. 455/575.1 |

(Continued)

FOREIGN PATENT DOCUMENTS

| CN | 101877736 A | 11/2010 |
|---|---|---|
| CN | 102232211 A | 11/2011 |

(Continued)

*Primary Examiner* — Srilakshmi K Kumar
*Assistant Examiner* — Brent D Castiaux
(74) *Attorney, Agent, or Firm* — Slater Matsil, LLP (57) ABSTRACT

The present invention discloses a method for automatically switching a handheld mode and a wireless handheld device. The present invention relates to the field of communications technologies. The method for automatically switching a handheld mode includes: updating, when it is detected that a duration during which handheld positions of a wireless handheld device do not match a preset first handheld mode of the wireless handheld device exceeds a first preset duration, a first user interface matching the first handheld mode to a second user interface matching a second handheld mode, where a layout of controls on the second user interface is a flip horizontal of a layout of controls on the first user interface.

17 Claims, 7 Drawing Sheets

Update, when it is detected that a duration during which handheld positions of a wireless handheld device do not match a preset first handheld mode of the wireless handheld device exceeds a first preset duration, a first user interface matching the first handheld mode to a second user interface matching a second handheld mode, where a layout of controls on the second user interface is a flip horizontal of a layout of controls on the first user interface 10
1

(51) Int. Cl.
*G06F 3/0484* (2013.01)
*G06F 3/0488* (2013.01)
*H04M 1/02* (2006.01)
*H04M 1/725* (2006.01)

(52) U.S. Cl.
CPC ........ *G06F 3/0488* (2013.01); *H04M 1/0281* (2013.01); *H04M 1/72569* (2013.01); *G06F 2200/1637* (2013.01); *H04M 1/72563* (2013.01); *H04M 2250/12* (2013.01); *H04M 2250/22* (2013.01)

(58) Field of Classification Search
CPC ............ G06F 3/0481; H04M 1/72569; H04M 1/0281; H04M 1/72563; H04M 2250/22; H04M 2250/12
USPC .......................................................... 345/173
See application file for complete search history.

(56) References Cited

U.S. PATENT DOCUMENTS

| | | | |
|---|---|---|---|
| 2009/0295743 A1 | 12/2009 | Nakajoh | |
| 2010/0085317 A1* | 4/2010 | Park | G06F 1/1626 345/173 |
| 2010/0087230 A1 | 4/2010 | Peh et al. | |
| 2010/0089723 A1 | 4/2010 | Peh et al. | |
| 2010/0097331 A1 | 4/2010 | Wu | |
| 2010/0277506 A1 | 11/2010 | Yao | |
| 2010/0310136 A1 | 12/2010 | Tsuda | |
| 2011/0032202 A1 | 2/2011 | Aoyagi et al. | |
| 2012/0032979 A1* | 2/2012 | Blow | G06F 1/1626 345/647 |
| 2012/0133601 A1* | 5/2012 | Marshall et al. | 345/173 |
| 2013/0234948 A1* | 9/2013 | Jian | 345/169 |
| 2013/0300687 A1* | 11/2013 | Park | G06F 3/1423 345/173 |
| 2014/0104172 A1 | 4/2014 | Li | |

FOREIGN PATENT DOCUMENTS

| | | |
|---|---|---|
| CN | 102375652 A | 3/2012 |
| EP | 1912109 A1 | 4/2008 |
| EP | 2085866 B1 | 6/2010 |
| JP | 09305315 A | 11/1997 |
| JP | 11231987 A | 8/1999 |
| JP | 2006277588 A | 10/2006 |
| JP | 2010191676 A | 9/2010 |
| JP | 201134538 A | 2/2011 |
| JP | 2011164676 A | 8/2011 |
| KR | 1020090084667 A | 8/2009 |

* cited by examiner

Update, when it is detected that a duration during which handheld positions of a wireless handheld device do not match a preset first handheld mode of the wireless handheld device exceeds a first preset duration, a first user interface matching the first handheld mode to a second user interface matching a second handheld mode, where a layout of controls on the second user interface is a flip horizontal of a layout of controls on the first user interface ~ 10 1

METHOD AND WIRELESS HANDHELD DEVICE FOR AUTOMATICALLY SWITCHING HANDHELD MODE

This application is a continuation of international Application No. PCT/CN2013/074496, filed on Apr. 22, 2013, which claims priority to Chinese Patent Application No. 201210121940.7, filed on Apr. 23, 2012, both of which are hereby incorporated by reference in their entireties.

TECHNICAL FIELD

The present invention relates to the field of communications technologies and, in particular embodiments, to a method and a wireless handheld device for automatically switching a handheld mode.

BACKGROUND

At present, with the advance of technology, a wireless handheld device (for example, a mobile phone) already becomes a necessary communication tool for people. Especially with the popularization of a wireless handheld device having a touchscreen, keys on the wireless handheld device are basically already replaced by the touchscreen. Positions of application icons or function icons on the touchscreen of the wireless handheld device are generally designed for convenience of operating the wireless handheld device with the right hand. However, such a wireless handheld device is inconvenient for a left-handed user or a user needing to operate the wireless handheld device with the left hand.

SUMMARY

On that account, embodiments of the present invention provide a method and a wireless handheld device for automatically switching a handheld mode, which can automatically switch a handheld mode, thereby facilitating user operations.

According to one aspect, a method for automatically switching a handheld mode is provided. When it is detected that a duration during which handheld positions of a wireless handheld device do not match a preset first handheld mode of the wireless handheld device exceeds a first preset duration, a first user interface matching the first handheld mode is provided to a second user interface matching a second handheld mode. A layout of controls on the second user interface is a flip horizontal of a layout of controls on the first user interface.

According to another aspect, a wireless handheld device is provided includes a sensor and at least one processor coupled to the sensor. The processor is configured to, when the sensor detects that a duration during which handheld positions of the wireless handheld device do not match a preset first handheld mode of the wireless handheld device exceeds a first preset duration, update a first user interface matching the first handheld mode to a second user interface matching a second handheld mode. A layout controls on the second user interface is a flip horizontal of a layout of controls on the first user interface.

The method and the wireless handheld device for automatically switching a handheld mode according to the embodiments of the present invention can implement automatic switching of a handheld mode, making it more convenient for a user to use a wireless handheld device with a single hand.

BRIEF DESCRIPTION OF THE DRAWINGS

To describe the technical solutions in the embodiments of the present invention more clearly, the following briefly introduces accompanying drawings required for describing the embodiments. Apparently, the accompanying drawings in the following description show merely some embodiments of the present invention, and a person of ordinary skill in the art may still derive other drawings according to these accompanying drawings without creative efforts.

DETAILED DESCRIPTION OF ILLUSTRATIVE EMBODIMENTS

To make objectives, technical solutions, and advantages of the present invention more comprehensible, the present invention is further described in detail with reference to the accompanying drawings and by using four embodiments as examples.

First, it should be noted that a wireless handheld device described in the embodiments of the present invention includes but is not limited to an electronic device having a touchscreen, such as mobile phones of various standards, smartphones based on different operating systems, and a personal digital assistant PDA. The touchscreen may have another name, for example, a touch-sensitive display, which is not limited herein.

The embodiments of the present invention will be described with reference to the following discussed details, and the accompanying drawings show the embodiments. The following descriptions and drawings are for illustration of the present invention, but shall not be explained as limitations to the present invention. A lot of specific details are described to facilitate a full understanding of the embodiments of the present invention. However, in some embodiments, well-known or conventional details are not described, so as to provide a brief discussion of the embodiments of the present invention.

A part of the following detailed descriptions are presented by algorithms, where these algorithms include operations on data stored in a computer memory. The algorithm is generally a sequence of operations for obtaining an expected result. These operations generally require or involve physical manipulation of physical quantities. Generally (though not necessarily), these quantities take a form of electrical or magnetic signals which can be stored, transmitted, combined, compared, and manipulated in other manners. It has proven convenient at times, primarily for reasons of common usage, to refer to these signals as bits, values, elements, symbols, characters, items, numbers, or the like.

However, all of these and similar terms are to be associated with appropriate physical quantities, and are merely convenient labels applied to these quantities. Unless specifically stated otherwise as apparent from the following discussions, it is to be understood that throughout this specification, a discussion using terms such as "locate", "detect", "match", "exceed", "perform", "update", or the like, refers to an action and processing of a data processing system or a similar electronic device. The data processing system or electronic device manipulates data expressed as physical (electronic) quantities in a register and a memory of a system, and transforms the data into other data similarly expressed as physical quantities in the register or the memory or another device of this type which stores, transmits, or displays information.

Figure 1:
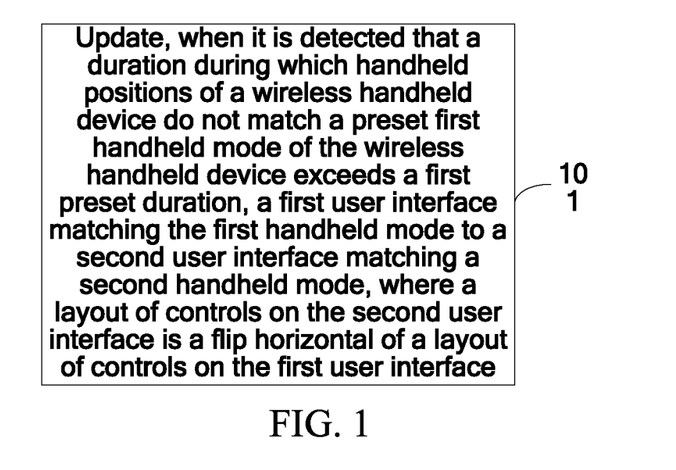
FIG. 1 is a flowchart of a method for automatically switching a handheld mode according to an embodiment of the present invention.

FIG. 1 illustrates a first embodiment method for automatically switching a handheld mode provided. The method includes the following steps.

101: When it is detected that a duration during which handheld positions of a wireless handheld device do not match a preset first handheld mode of the wireless handheld device exceeds a first preset duration, update a first user interface matching the first handheld mode to a second user interface matching a second handheld mode, where a layout of controls on the second user interface is a flip horizontal of a layout of controls on the first user interface.

Figure 8:
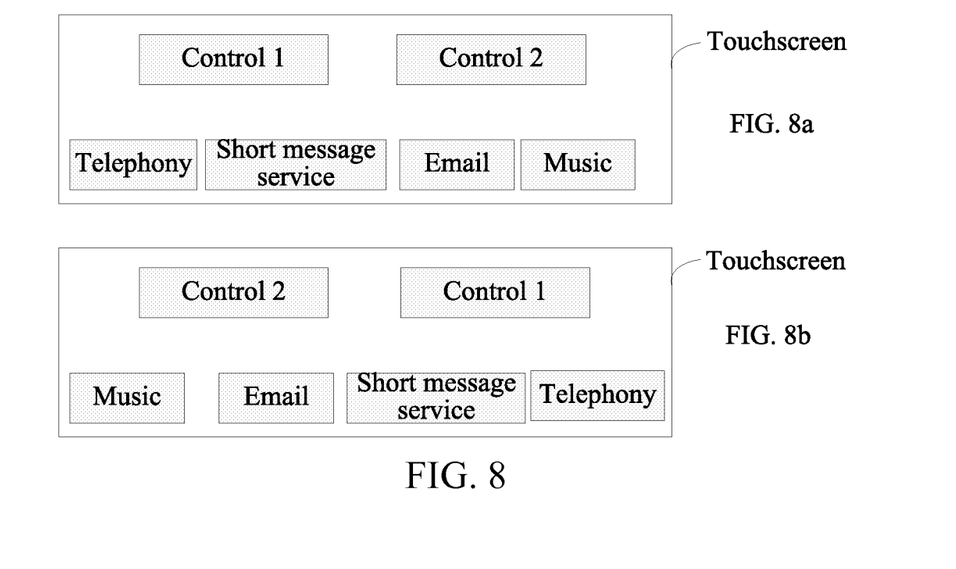
FIG. 8 is a schematic diagram of a user interface according to an embodiment of the present invention.
Figure 9:
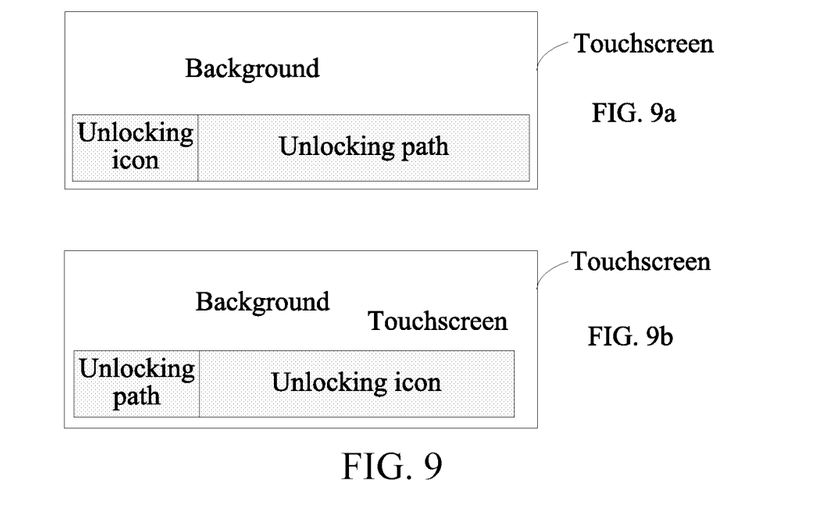
FIG. 9 is a schematic diagram of another user interface according to an embodiment of the present invention.

It should be noted that in the embodiment of the present invention, the handheld mode includes a left hand mode and a right hand mode. The left hand mode is a mode convenient for operating the wireless handheld device with the left hand, and the right hand mode is a mode convenient for operating the wireless handheld device with the right hand. Definitely, the left hand mode and the right hand mode may also have another name, which is not limited herein. In the embodiment of the present invention, an example in which the first handheld mode is the right hand mode and the second handheld mode is the left hand mode is used for description. The first user interface is a user interface matching the first handheld mode, and the second user interface is a user interface matching the second handheld mode. The layout of the controls on the second user interface is the flip horizontal of the layout of the controls on the first user interface. For example, as shown in FIG. 8, if it is assumed that the layout of the controls on the first user interface is shown in FIG. 8a, the layout of the controls on the second user interface is shown in FIG. 8b; or as shown in FIG. 9, if it is assumed that layout of the controls on the first user interface is shown in FIG. 9a, the layout of the controls on the second user interface is shown in FIG. 9b.

It should be understood that a background of the first user interface and a background of the second user interface may be the same or different. In addition, the wireless handheld device has at least two user interfaces for handheld modes, that is, the first user interface matching the first handheld mode and the second user interface matching the second handheld mode, where the layout of the controls on the second user interface is the flip horizontal of the layout of the controls on the first user interface.

It should be understood that when a preset handheld mode of the wireless handheld device is the first handheld mode (that is, the right hand mode), both a user interface of the wireless handheld device in a user-interface locked state and a user interface of the wireless handheld device in a user-interface non-locked state belong to the first user interface matching the first handheld mode, that is, the first user interface includes a graphical interactive interface and/or graphical interactive interface objects of the wireless handheld device in any state. For example, when the wireless handheld device is in a user-interface locked state, the first user interface is displayed to include a graphical interactive interface (for example, a background shown in FIG. 9a) and a graphical interactive interface object (for example, an unlocking icon and an unlocking path shown in FIG. 9a). When the wireless handheld device switches to the second handheld mode (that is, the left hand mode), both the user interface of the wireless handheld device in the user-interface locked state and the user interface of the wireless handheld device in the user-interface non-locked state belong to the second user interface matching the second handheld mode, that is, the second user interface includes a graphical interactive interface and/or a graphical interactive interface object of the wireless handheld device in any state. For example, when the wireless handheld device is in a user-interface locked state, the second user interface is displayed to include a graphical interactive interface (for example, a background shown in FIG. 9b) and a graphical interactive interface object (for example, an unlocking icon and an unlocking path shown in FIG. 9b). It should be noted that the background in FIG. 9a and the background in FIG. 9b may be the same or different, which is not limited herein. In addition, the background in FIG. 9a and the background in FIG. 9b are not shown.

When the wireless handheld device detects that the duration during which the handheld positions of the wireless handheld device do not match the preset first handheld mode of the wireless handheld device exceeds the first preset duration, the wireless handheld device updates the first user interface matching the first handheld mode to the second user interface matching the second handheld mode, where the layout of the controls on the second user interface is the flip horizontal of the layout of the controls on the first user interface.

The wireless handheld device may obtain, based on a touch sensing technology and/or a pressure sensing technology, the handheld positions of the wireless handheld device.

Specifically, for example, one or more sensors are configured on each surface of the wireless handheld device, where the sensor may include one or more of a resistive sensor, a capacitive sensor, an inductive sensor, a pressure sensor, a piezoelectric sensor, and the like. When a user holds the wireless handheld device, the wireless handheld device can detect, according to the touch sensing technology and/or the pressure sensing technology, the handheld positions of the wireless handheld device, thereby determining whether the detected handheld positions of the wireless handheld device match the preset first handheld mode.

It should be understood that the touch sensing technology may also be referred to as a touch sensing technology, and a touch sensor using the touch sensing technology generally includes a resistive sensor, an inductive sensor, and a capacitive sensor. The touch sensor can provide a convenient control manner and can be used to control nearly devices of any type. At present, the touch sensor can provide some generic performance options and forms, such as a slider and an adjacent sensor. The development and advance of a touch sensor technology makes it easier to implement a driven interface of the sensor, and therefore, the touch sensor technology is more easily applied to different types of wireless handheld devices. At present, a relatively widely applied capacitive sensor works depending on a detected capacitance change; that is, when a conductive object or a person approaches or touches a conductive metal plate of a touch capacitive sensor, a capacitance between a finger and the metal plate changes, and a control circuit can detect the change. Therefore, the touch sensor generally detects a change of the capacitance by measuring an impedance of a circuit connected to a sensor gasket, thereby determining whether a touch event occurs.

The pressure sensor is a sensor for measuring pressure of liquids and gases. The pressure sensor is a sensor converting pressure into an electrical signal and outputting the electrical signal, and is generally formed by an elastic sensitive component and a displacement sensitive component (or a strain meter). A function of the elastic sensitive component is to make measured pressure act on a certain area, and convert the pressure into displacement or strain which is then converted by the displacement sensitive component or the strain meter into an electrical signal having a certain relationship with the pressure. The functions of the elastic sensitive component and the displacement sensitive component may also be integrated. The pressure sensor is the most widely applied sensor in industry practice, while the generally used pressure sensor is manufactured using a piezoelectric effect, and such a sensor is also referred to as a piezoelectric effect sensor.

The following specifically describes, by controlling a wireless handheld device as an example and with reference to schematic block diagrams showing that a user holds a terminal such as a wireless handheld device in FIG. 2A to FIG. 6B, how the wireless handheld device determines, according to the handheld positions of the wireless handheld device, whether the wireless handheld device is held with the left hand or the right hand.

In the schematic diagrams shown in FIG. 2A to FIG. 6B, a rectangular box represents a wireless handheld device, and A, B, C, D, and E respectively represent a thumb, an index finger, a middle finger, a ring finger, and a little finger. It should be understood that in an actual application, due to different appearances of wireless handheld devices and different usage habits of users, distributions of positions of fingers of the users on the wireless handheld devices may be different to some degree. However, these examples are used only for describing the embodiments of the present invention, and shall not constitute any limitation on the present invention.

Figure 2A:
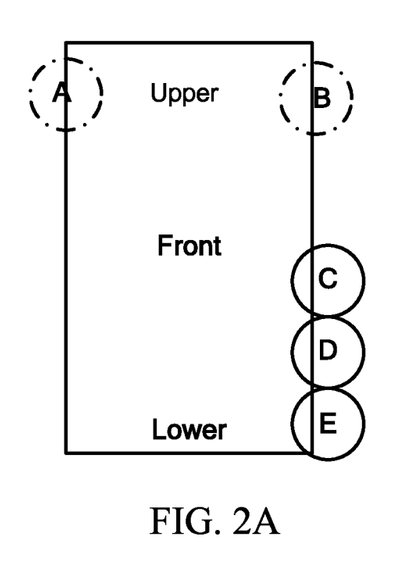
FIG. 2A and FIG. 2B are schematic block diagrams showing that a user holds a wireless handheld device with the left hand and with the right hand respectively.
Figure 2B:
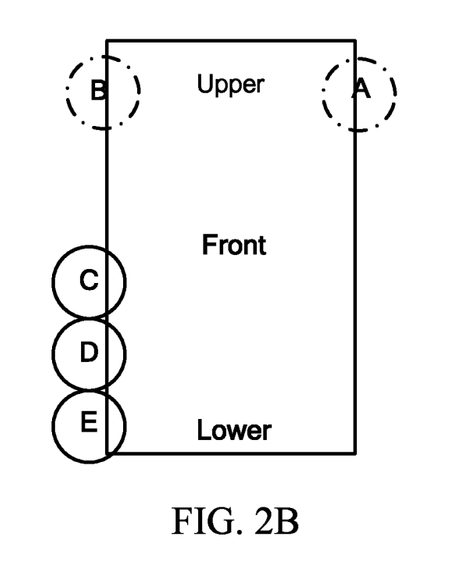

FIG. 2A and FIG. 2B are schematic diagrams showing that a user holds a wireless handheld device with the left hand and with the right hand respectively. In FIG. 2A and FIG. 2B, distribution of handheld positions of the wireless handheld device on the wireless handheld device is specifically as follows: the wireless handheld device is fixed with the middle finger C, ring finger D, and little finger E of the user, and the thumb A and index finger B are in a flexible state rather than a fixed state. Therefore, when the wireless handheld device detects that distribution of the handheld positions of the wireless handheld device on the wireless handheld device is the same as that shown in FIG. 2A, the wireless handheld device can determine, according to the distribution of the positions, that the wireless handheld device is held in the left hand; and when the wireless handheld device detects that distribution of the handheld positions of the wireless handheld device on the wireless handheld device is the same as that shown in FIG. 2B, the wireless handheld device can determine, according to the distribution of the positions, that the wireless handheld device is held in the right hand.

Figure 3A:
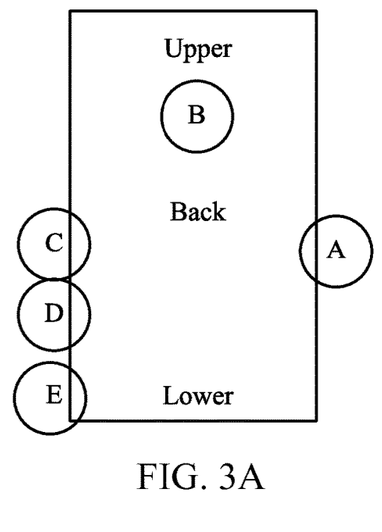
FIG. 3A and FIG. 3B are another two schematic block diagrams showing that a user holds a wireless handheld device with the left hand and with the right hand respectively.
Figure 3B:
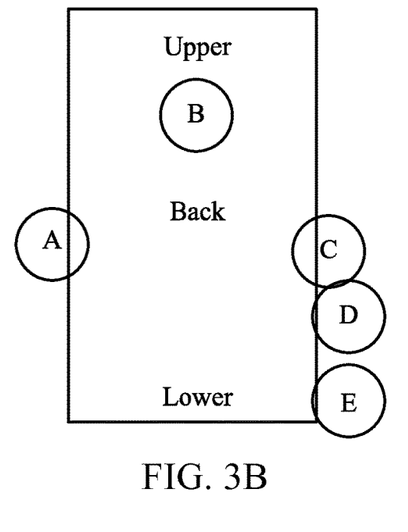

FIG. 3A and FIG. 3B are schematic diagrams showing that a user holds a wireless handheld device with the left hand and with the right hand respectively. In FIG. 3A and FIG. 3B, distribution of handheld positions of the wireless handheld device on the wireless handheld device is specifically as follows: the thumb A, middle finger C, ring finger D, and little finger E retract and hold the wireless handheld device lightly, and the index finger B serves as a supporting point at the back of the wireless handheld device. Therefore, when the wireless handheld device detects that distribution of the handheld positions of the wireless handheld device on the wireless handheld device is the same as that shown in FIG. 3A, the wireless handheld device can determine, according to the distribution of the positions, that the wireless handheld device is held in the left hand; and when the wireless handheld device detects that distribution of the handheld positions of the wireless handheld device on the wireless handheld device is the same as that shown in FIG. 3B, the wireless handheld device can determine, according to the distribution of the positions, that the wireless handheld device is held in the right hand.

Figure 4A:
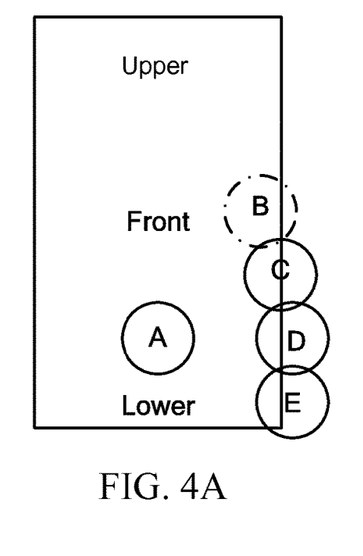
FIG. 4A and FIG. 4B are still another two schematic block diagrams showing that a user holds a wireless handheld device with the left hand and with the right hand respectively.
Figure 4B:
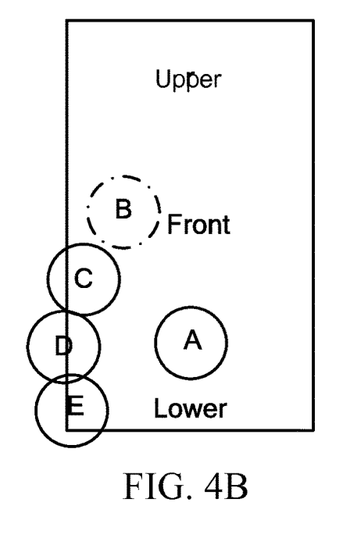
Figure 4C:
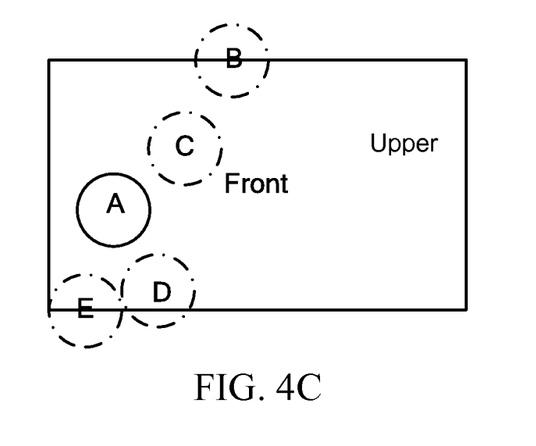
FIG. 4C and FIG. 4D are still another two schematic block diagrams showing that a user holds the wireless handheld device with the left hand and with the right hand respectively.
Figure 4D:
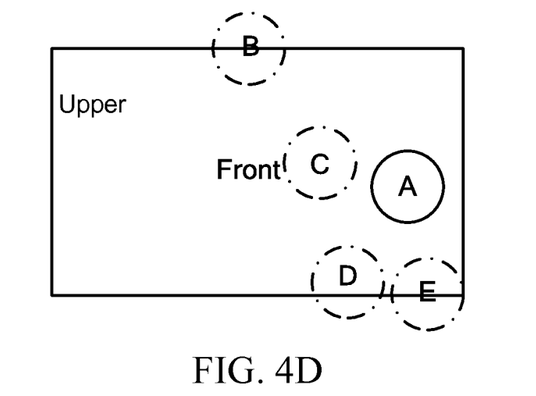

FIG. 4A and FIG. 4B are schematic block diagrams showing that a user holds a wireless handheld device vertically with the left hand and with the right hand respectively, and FIG. 4C and FIG. 4D are schematic block diagrams showing that a user holds the wireless handheld device horizontally with the left hand and with the right hand respectively. In FIG. 4A, FIG. 4B, FIG. 4C, and FIG. 4D, the user holds the wireless handheld device at an end faraway from a camera, which is generally a lower part of the wireless handheld device, where the thumb A is generally at a far-end midpoint on a front side, the rest four fingers B, C, D, and E hold the wireless handheld device by the other side, and the whole wireless handheld device is held upright. Therefore, when the wireless handheld device detects that distribution of the handheld positions of the wireless handheld device on the wireless handheld device is the same as that shown in FIG. 4A or FIG. 4C, the wireless handheld device can determine, according to the distribution of the positions, that the wireless handheld device is held in the left hand; and when the wireless handheld device detects that distribution of the handheld positions of the wireless handheld device on the wireless handheld device is the same as that shown in FIG. 4B or FIG. 4D, the wireless handheld device can determine, according to the distribution of the positions, that the wireless handheld device is held in the right hand.

Figure 5A:
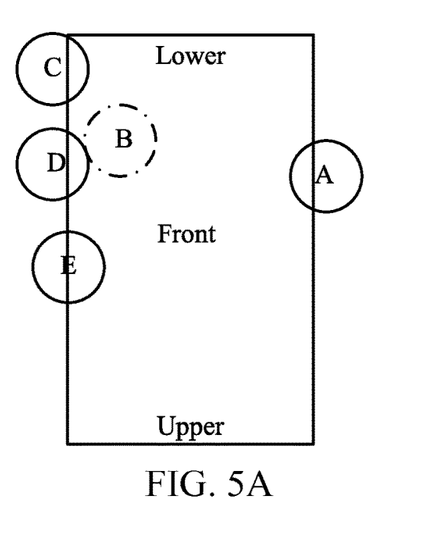
FIG. 5A and FIG. 5B are still another two schematic block diagrams showing that a user holds a wireless handheld device with the left hand and with the right hand respectively.
Figure 5B:
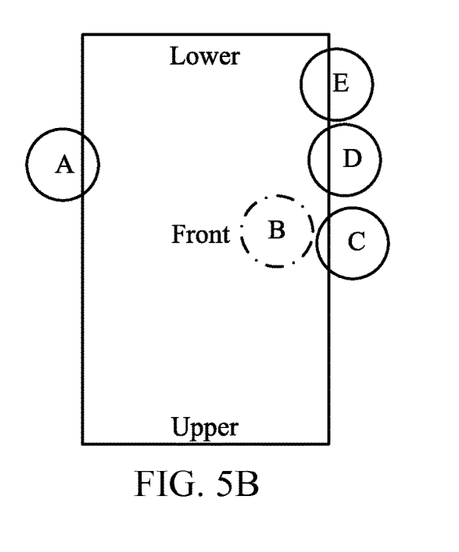

FIG. 5A and FIG. 5B are still another two schematic block diagrams showing that a user holds a wireless handheld device with the left hand and with the right hand respectively. In FIG. 5A or FIG. 5B, the user holds the wireless handheld device, and the wireless handheld device is upside down. Therefore, when the wireless handheld device detects that distribution of the handheld positions of the wireless handheld device on the wireless handheld device is the same as that shown in FIG. 5A, the wireless handheld device can determine, according to the distribution of the positions, that the wireless handheld device is held in the left hand; and when the wireless handheld device detects that distribution of the handheld positions of the wireless handheld device on the wireless handheld device is the same as that shown in FIG. 5B, the wireless handheld device can determine, according to the distribution of the positions, that the wireless handheld device is held in the right hand.

Figure 6A:
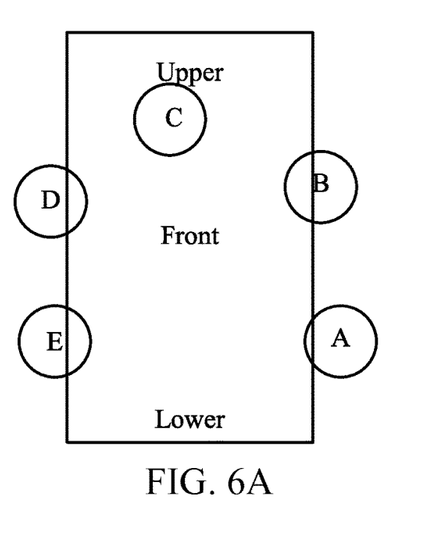
FIG. 6A and FIG. 6B are still another two schematic block diagrams showing that a user holds a wireless handheld device with the left hand and with the right hand respectively.
Figure 6B:
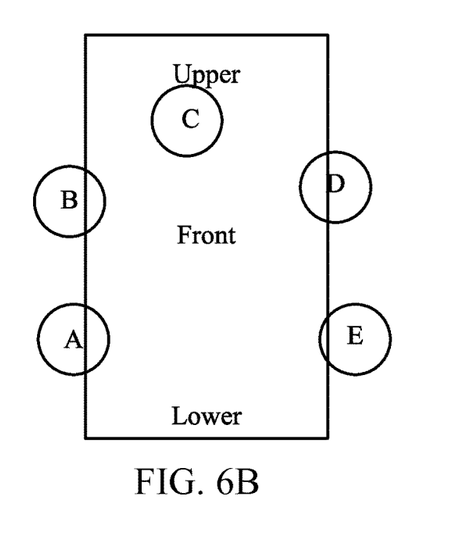

FIG. 6A and FIG. 6B are still another two schematic block diagrams showing that a user holds a wireless handheld device with the left hand and with the right hand respectively. In FIG. 6A or FIG. 6B, the user holds the wireless handheld device with the palm facing a screen, where the thumb A and the index finger B are on one side of the wireless handheld device, the ring finger D the little finger E are on the other side of the wireless handheld device, and the middle finger C is on the middle upper part of the wireless handheld device; that is, a whole hand of the user covers the screen. Therefore, when the wireless handheld device detects that distribution of the handheld positions of the wireless handheld device on the wireless handheld device is the same as that shown in FIG. 6A, the wireless handheld device can determine, according to the distribution of the positions, that the wireless handheld device is held in the left hand; and when the wireless handheld device detects that distribution of the handheld positions of the wireless handheld device on the wireless handheld device is the same as that shown in FIG. 6B, the wireless handheld device can determine, according to the distribution of the positions, that the wireless handheld device is held in the right hand.

It should be understood that the foregoing describes, by using examples and with reference to FIG. 2A to FIG. 6B, the schematic diagrams showing that a user holds a wireless handheld device in common cases, and describes, by using these examples, how the wireless handheld device determines, according to the handheld positions of the wireless handheld device, whether the wireless handheld device is held in the left hand or the right hand, but the present invention is not limited to these examples.

For example, when the wireless handheld device detects that the wireless handheld device is held by the left hand and the duration during which the wireless handheld device is held with the left hand exceeds the first preset duration, the wireless handheld device updates the first user interface matching the first handheld mode to the second user interface matching the second handheld mode, where the layout of the controls on the second user interface is the flip horizontal of the layout of the controls on the first user interface; the duration refers to a continuous time length which may be measured in seconds; and the first preset duration is a preset time length which may be measured in seconds, where a specific value of the time length is not limited, for example, the first preset duration is 30 seconds.

It should be noted that the controls on the user interface (at least including the first user interface and the second user interface) include but are not limited to various icons distributed on the user interface, such as an application icon and an unlocking image. It should be understood that the unlocking image in the embodiment of the present invention includes but is not limited to at least one of an unlocking icon and an unlocking path. The unlocking image may be an unlocking icon at one end of an unlocking path shown in FIG. 9; or may be that an unlocking icon is at the center, from which there are at least two unlocking paths and the other end of each unlocking path is an application icon, where the application icon includes but is not limited to one of all application icons on the wireless handheld device, and each application icon corresponds to an application or a function, such as telephony, text messaging, a camera, a radio, a browser, microblog, or a map. Application icons are various in types and therefore are not listed one by one herein.

It should be noted that step 101 is executed by a wireless handheld device.

In the method for automatically switching a handheld mode provided above, when it is detected that the duration during which the handheld positions of the wireless handheld device do not match the preset first handheld mode of the wireless handheld device exceeds the first preset duration, the first user interface matching the first handheld mode is updated to the second user interface matching the second handheld mode, where the layout of the controls on the second user interface is the flip horizontal of the layout of the controls on the first user interface, thereby implementing automatic switching of a handheld mode and making it more convenient for a user to use a wireless handheld device with a single hand.

Figure 7:
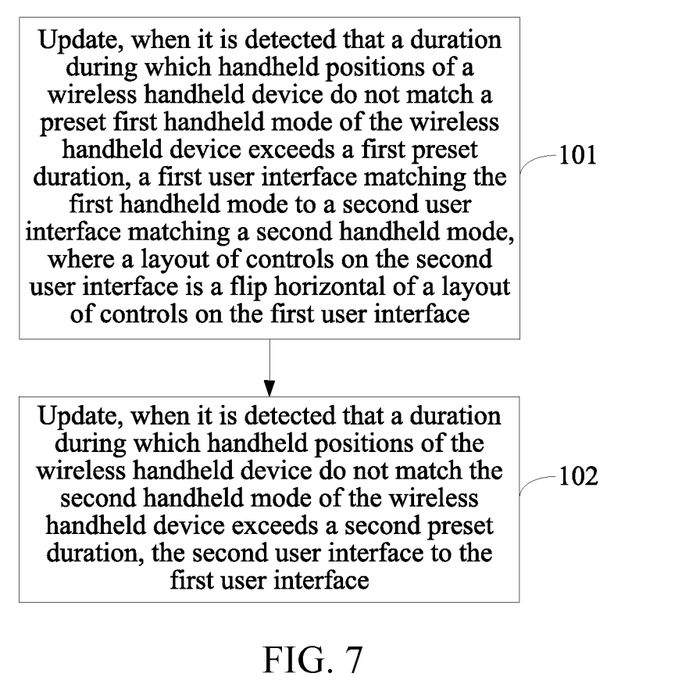
FIG. 7 is a flowchart of another method for automatically switching a handheld mode according to an embodiment of the present invention.

Optionally or additionally, as shown in FIG. 7, after step 101, the method further includes:

102: When it is detected that a duration during which handheld positions of the wireless handheld device do not match the second handheld mode of the wireless handheld device exceeds a second preset duration, update the second user interface to the first user interface.

When the wireless handheld device detects that the duration during which the handheld positions of the wireless handheld device do not match the second handheld mode of the wireless handheld device exceeds the second preset duration, the wireless handheld device updates the second user interface to the first user interface.

It should be understood that the second preset duration is a preset time length which may be measured in seconds, and a specific value of the time length is not limited, for example, the second preset duration is 20 seconds.

The foregoing step 102 is optional; however, by performing the step 102, the wireless handheld device can automatically switch to a preset handheld mode when the preset handheld mode is satisfied, thereby satisfying personalized applications of a user. For example, a user using the wireless handheld device with the right hand sets a preset handheld mode of the wireless handheld device to the right hand mode; when the right hand is occupied and the user needs to hold and operate the wireless handheld device temporarily with the left hand, the wireless handheld device can automatically switch to the left hand mode to facilitate use for the user; and when the user can hold and operate the wireless handheld device with the right hand, the wireless handheld device can automatically switch back to the right hand mode to facilitate use for the user.

Optionally or additionally, step 101, that is, the step of updating, when it is detected that a duration during which handheld positions of a wireless handheld device do not match a preset first handheld mode of the wireless handheld device exceeds a first preset duration, a first user interface matching the first handheld mode to a second user interface matching a second handheld mode, can include a number of alternatives.

For example, when the wireless handheld device is in a user-interface locked state, and it is detected that the duration during which the handheld positions of the wireless handheld device do not match the preset first handheld mode of the wireless handheld device exceeds the first preset duration, the first user interface updates matching the first handheld mode to the second user interface matching the second handheld mode. In another example, when the wireless handheld device is in a user-interface non-locked state, and it is detected that the duration during which the handheld positions of the wireless handheld device do not match the preset first handheld mode of the wireless handheld device exceeds the first preset duration, the first user interface updates matching the first handheld mode to the second user interface matching the second handheld mode.

The foregoing optional solution implements that the wireless handheld device can automatically switch from a preset handheld mode to another handheld mode in different use scenarios.

Optionally or additionally, step 102, that is, the step of updating, when it is detected that a duration during which handheld positions of the wireless handheld device do not match the second handheld mode of the wireless handheld device exceeds a second preset duration, the second user interface to the first user interface, specifically includes: when the wireless handheld device is in a user-interface non-locked state, and it is detected that the duration during which the handheld positions of the wireless handheld device do not match the second handheld mode of the wireless handheld device exceeds the second preset duration, updating the second user interface to the first user interface; or when the wireless handheld device is in a user-interface locked state, and it is detected that the duration during which the handheld positions of the wireless handheld device do not match the second handheld mode of the wireless handheld device exceeds the second preset duration, updating the second user interface to the first user interface.

The foregoing optional solution implements that the wireless handheld device can automatically switch from another handheld mode back to a preset handheld mode in different use scenarios.

It should be noted that step 101 and step 102 are executed by a wireless handheld device.

It should be noted that the first preset duration and the second preset duration may be the same or different. The first preset duration or the second preset duration may be zero and may specifically be set by a user according to the needs; and definitely, a default value is set for the wireless handheld device when it leaves the factory.

Figure 10:
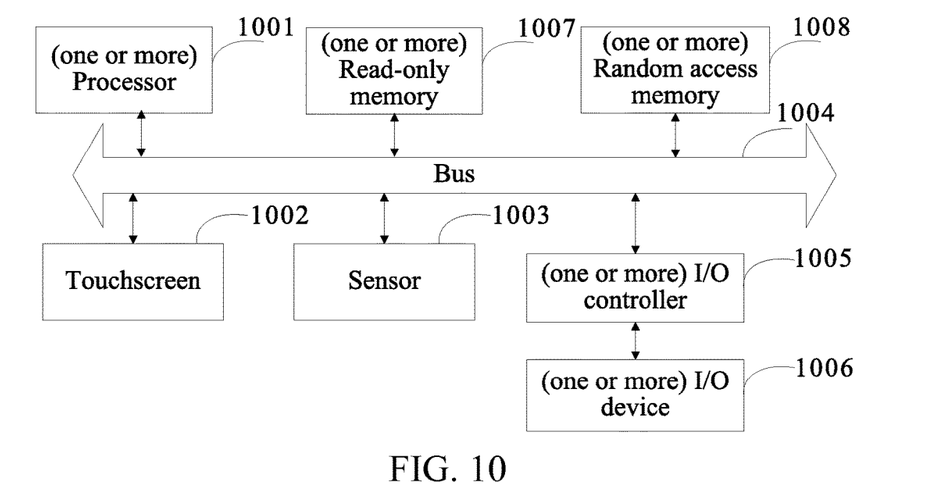
FIG. 10 is a schematic diagram of a wireless handheld device according to an embodiment of the present invention.

FIG. 10 is a block diagram of a wireless handheld device according to the first embodiment of the present invention. A use scenario of the wireless handheld device is exactly the same as that in the embodiments described above, so details are not described herein again.

The wireless handheld device may include: at least one processor 1001 and at least one sensor 1003, where the processor 1001 and the sensor 1003 are coupled to each other through a bus 1004.

Optionally, the wireless handheld device may further include a touchscreen 1002 coupled to another component through the bus 1004.

Optionally, the wireless handheld device further includes one or more I/O (input/output) controllers 1005 coupled to another component through the bus 1004. The one or more I/O controllers 1005 provide an interface or interfaces to one or more I/O (input/output) devices 1006.

Optionally, the wireless handheld device further includes one or more read-only memories (ROM) 1007 coupled to another component through the bus 1004.

Optionally, the wireless handheld device further includes one or more random access memories (RAM) 1008 coupled to another component through the bus 1004.

The bus 1004 may include one or more buses connected to each other through bridges, controllers, and/or adapters well known in this art. The I/O device 1006 may include controllers of a keypad, a keyboard, or a cursor.

Embodiment 2 of the present invention provides a wireless handheld device, including a sensor 1003 and at least one processor 1001 coupled to the sensor 1003. The processor 1001 is configured to, when the sensor 1003 detects that a duration during which handheld positions of the wireless handheld device do not match a preset first handheld mode of the wireless handheld device exceeds a first preset duration, update a first user interface matching the first handheld mode to a second user interface matching a second handheld mode. The layout of controls on the second user interface is a flip horizontal of a layout of controls on the first user interface.

Specifically, when the sensor 1003 detects that the duration during which the handheld positions of the wireless handheld device do not match the preset first handheld mode of the wireless handheld device exceeds the first preset duration, the sensor 1003 outputs a corresponding signal value (such as a certain binary numerical value or a certain hexadecimal numerical value) to the at least one processor 1001; and after the processor 1001 receives the signal value, the processor 1001 updates the first user interface matching the first handheld mode to the second user interface matching the second handheld mode, where the layout of the controls on the second user interface is the flip horizontal of the layout of the controls on the first user interface.

When the wireless handheld device provided by Embodiment 2 of the present invention detects that the duration during which the handheld positions of the wireless handheld device do not match the preset first handheld mode of the wireless handheld device exceeds the first preset duration, the wireless handheld device updates the first user interface matching the first handheld mode to the second user interface matching the second handheld mode, where the layout of the controls on the second user interface is the flip horizontal of the layout of the controls on the first user interface, thereby implementing automatic switching of a handheld mode and making it more convenient for a user to use the wireless handheld device with a single hand.

Optionally or additionally, the processor 1001 is further configured to: when the sensor 1003 detects that a duration during which handheld positions of the wireless handheld device do not match the second handheld mode of the wireless handheld device exceeds a second preset duration, update the second user interface to the first user interface.

Specifically, when the sensor 1003 detects that the duration during which the handheld positions of the wireless handheld device do not match the second handheld mode of the wireless handheld device exceeds the second preset duration, the sensor 1003 outputs a corresponding signal value (such as a certain binary numerical value or a certain hexadecimal numerical value) to the at least one processor 1001; and after the processor 1001 receives the signal value, the processor 1001 updates the second user interface to the first user interface.

By adopting the foregoing optional solution, the wireless handheld device can automatically switch to a preset handheld mode when the preset handheld mode is satisfied, thereby satisfying personalized applications for a user. For example, a user using the wireless handheld device with the right hand sets a preset handheld mode of the wireless handheld device to the right hand mode; when the right hand is occupied and the user needs to hold and operate the wireless handheld device temporarily with the left hand, the wireless handheld device can automatically switch to the left hand mode to facilitate use for the user; and when the user can hold and operate the wireless handheld device with the right hand, the wireless handheld device can automatically switch back to the right hand mode to facilitate use for the user.

Optionally or additionally, the processor 1001 is further configured to: when the wireless handheld device is in a user-interface locked state, and the sensor 1003 detects that the duration during which the handheld positions of the wireless handheld device do not match the preset first handheld mode of the wireless handheld device exceeds the first preset duration, update the first user interface matching the first handheld mode to the second user interface matching the second handheld mode.

Specifically, when the sensor 1003 detects, when the wireless handheld device is in a user-interface locked state, that the duration during which the handheld positions of the wireless handheld device do not match the preset first handheld mode of the wireless handheld device exceeds the first preset duration, the sensor 1003 outputs a corresponding signal value (such as a certain binary numerical value or a certain hexadecimal numerical value) to the at least one processor 1001; and after the processor 1001 receives the signal value, the processor 1001 updates the first user interface matching the first handheld mode to the second user interface matching the second handheld mode.

The foregoing optional solution implements that the wireless handheld device can automatically switch from a preset handheld mode to another handheld mode in different use scenarios.

Optionally or additionally, the processor 1001 is further configured to: when the wireless handheld device is in a user-interface non-locked state, and the sensor 1003 detects that the duration during which the handheld positions of the wireless handheld device do not match the preset first handheld mode of the wireless handheld device exceeds the first preset duration, update the first user interface matching the first handheld mode to the second user interface matching the second handheld mode.

Specifically, when the sensor 1003 detects, when the wireless handheld device is in a user-interface non-locked state, that the duration during which the handheld positions of the wireless handheld device do not match the preset first handheld mode of the wireless handheld device exceeds the first preset duration, the sensor 1003 outputs a corresponding signal value (such as a certain binary numerical value or a certain hexadecimal numerical value) to the at least one processor 1001; and after the processor 1001 receives the signal value, the processor 1001 updates the first user interface matching the first handheld mode to the second user interface matching the second handheld mode.

The foregoing optional solution implements that the wireless handheld device can automatically switch from a preset handheld mode to another handheld mode in different use scenarios.

Optionally or additionally, the processor 1001 is further configured to: when the wireless handheld device is in a user-interface non-locked state, and the sensor 1003 detects that the duration during which the handheld positions of the wireless handheld device do not match the second handheld mode of the wireless handheld device exceeds the second preset duration, update the second user interface to the first user interface.

Specifically, when the sensor 1003 detects, when the wireless handheld device is in a user-interface non-locked state, that the duration during which the handheld positions of the wireless handheld device do not match the second handheld mode of the wireless handheld device exceeds the second preset duration, the sensor 1003 outputs a corresponding signal value (such as a certain binary numerical value or a certain hexadecimal numerical value) to the at least one processor 1001; and after the processor 1001 receives the signal value, the processor 1001 updates the second user interface to the first user interface.

The foregoing optional solution implements that the wireless handheld device can automatically switch from another handheld mode back to a preset handheld mode in different use scenarios.

Optionally or additionally, the processor 1001 is further configured to: when the wireless handheld device is in a user-interface locked state, and the sensor 1003 detects that the duration during which the handheld positions of the wireless handheld device do not match the second handheld mode of the wireless handheld device exceeds the second preset duration, update the second user interface to the first user interface.

Specifically, when the sensor 1003 detects, when the wireless handheld device is in a user-interface locked state, that the duration during which the handheld positions of the wireless handheld device do not match the second handheld mode of the wireless handheld device exceeds the second preset duration, the sensor 1003 outputs a corresponding signal value (such as a certain binary numerical value or a certain hexadecimal numerical value) to the at least one processor 1001; and after the processor 1001 receives the signal value, the processor 1001 updates the second user interface to the first user interface.

The foregoing optional solution implements that the wireless handheld device can automatically switch from another handheld mode back to a preset handheld mode in different use scenarios.

It should be noted that for an operation executed by hardware of the wireless handheld device or executed by hardware in cooperation with corresponding software, reference may be made to a part or all of steps 101 and 102 of the method in the foregoing embodiments 1, so the details are not described herein again to avoid repetition.

In addition, a computer-readable medium (or medium) is further provided, including a computer-readable instruction which performs the following operation when being executed: an operation of executing a part or all of steps 101 and 102 in the foregoing embodiment.

A person skilled in the art may understand that the accompanying drawings are merely schematic diagrams of an exemplary embodiment, and the modules, entities, or processes in the accompanying drawings are not necessarily required in implementing the present invention.

It may be clearly understood by a person skilled in the art that, for the purpose of convenient and brief description, for a detailed working process of the foregoing apparatuses or components, reference may be made to a corresponding process in the foregoing method embodiments, so details are not described herein again.

In the several embodiments provided in the present application, it should be understood that the disclosed apparatus and method may be implemented in other manners. For example, the described apparatus embodiments are merely exemplary. For example, the component division is merely logical function division and may be other division in actual implementation. For example, a plurality of components may be combined or integrated into another component, or some features may be ignored or not performed. In addition, the displayed or discussed mutual couplings or direct couplings or communication connections may be implemented through some interfaces. The indirect couplings or communication connections between the apparatuses or components may be implemented in electronic, mechanical, or other forms.

In addition, the components in the embodiments of the present invention may be integrated into one component or unit, or each of the units may exist alone physically, or two or more units may be integrated into one component or unit.

When the functions are implemented in a form of a software functional unit and sold or used as an independent product, the functions may be stored in a computer-readable storage medium. Based on such understanding, the technical solutions of the present invention essentially, or the part contributing to the prior art, or a part of the technical solutions may be implemented in a form of a software product. The software product is stored in a storage medium, and includes several instructions for instructing a computer device (which may be a personal computer, a server, a network device, or the like) to perform all or a part of the steps of the methods described in the embodiments of the present invention. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific embodiments of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A method for automatically switching a handheld mode, the method comprising:
    when a wireless handheld device is in a user-interface locked state, displaying a first preset user interface corresponding to a first handheld mode, wherein the first preset user interface comprises a first unlocking icon and a first unlocking path, and the first unlocking icon is at one end of the first unlocking path, wherein the first handheld mode is a preset mode associated with one of a plurality of first handheld positions and a first preset user interface;
    detecting that a duration during which handheld positions of the wireless handheld device match a second handheld mode of the wireless handheld device exceeds a first preset duration; and
    displaying a second preset user interface corresponding to the second handheld mode in response to detecting that the duration exceeds the first preset duration, wherein the second preset user interface comprises a second unlocking icon and a second unlocking path, and the second unlocking icon is at one end of the second unlocking path, wherein the second handheld mode is a different preset mode associated with one of a plurality of second handheld positions and a second preset user interface, and each of the plurality of the first and second handheld positions comprise a touch position on the back of the wireless handheld device and a touch position on a side of the wireless handheld device, wherein the plurality of first handheld positions are different from the plurality of second handheld positions,
    wherein a layout of the second unlocking icon and the second unlocking path on the second preset user interface is a mirror image of a layout of the first unlocking icon and the first unlocking path on the first preset user interface, and wherein the mirror image is a reflection of the layout of controls about a centered axis of a screen of the wireless handheld device.

2. The method according to claim 1, further comprising when the wireless handheld device is in an user-interface unlocked state, displaying a third preset user interface corresponding to the first handheld mode when it is detected that a duration during which handheld positions of the wireless handheld device match the first handheld mode of the wireless handheld device exceeds a second preset duration.

3. The method according to claim 2, wherein when the wireless handheld device is in the user-interface unlocked state, displaying a fourth preset user interface corresponding to the second handheld mode, when it is detected that the duration during which the handheld positions of the wireless handheld device match the second handheld mode of the wireless handheld device exceeds the second preset duration, wherein a layout of controls on the third preset user interface is a mirror image of a layout of controls on the fourth preset user interface.

4. The method according to claim 1, wherein displaying the first user interface when the wireless handheld device is in the user-interface locked state and it is detected that the duration during which the handheld positions of the wireless handheld device match the first handheld mode of the wireless handheld device exceeds the second preset duration.

5. The method according to claim 1, wherein displaying the first user interface, when the wireless handheld device is in the user-interface locked state and it is detected that the duration during which the handheld positions of the wireless handheld device do not match the second handheld mode of the wireless handheld device exceeds the first preset duration.

6. A wireless handheld device, comprising:
    a sensor; and
    at least one processor coupled to the sensor, wherein the at least one processor is configured to:
        when the wireless handheld device is in a user-interface locked state, display a first preset user interface corresponding to a first handheld mode, wherein the first preset user interface comprises a first unlocking icon and a first unlocking path, and the first unlocking icon is at one end of the first unlocking path, wherein the first handheld mode is a preset mode associated with one of a plurality of first handheld positions and a first preset user interface;
        display a second preset user interface corresponding to the second handheld mode when the sensor detects that a duration during which handheld positions of the wireless handheld device match the second handheld mode of the wireless handheld device exceeds a first preset duration, wherein the second preset user interface comprises a second unlocking icon and a second unlocking path, and the second unlocking icon is at one end of the second unlocking path, wherein the second handheld mode is a different preset mode associated with one of a plurality of second handheld positions and a second preset user interface, and each of the plurality of the first and second handheld positions comprise a touch position on the back of the wireless handheld device and a touch position on a side of the wireless handheld device, wherein the plurality of first handheld positions is different from the plurality of second handheld positions, wherein a layout of the second unlocking icon and the second unlocking path on the second preset user interface is a mirror image of a layout of the first unlocking icon and the first unlocking path on the first preset user interface, and wherein the mirror image is a reflection of the layout of controls about a centered axis of a screen of the wireless handheld device.

7. The wireless handheld device according to claim 6, wherein the at least one processor is further configured to display a third preset user interface corresponding to the first handheld mode when the wireless handheld device is in an user-interface unlocked state, and the sensor detects that a duration during which handheld positions of the wireless handheld device match the first handheld mode of the wireless handheld device exceeds a second preset duration.

8. The wireless handheld device according to claim 7, wherein the at least one processor is further configured to display a fourth preset user interface corresponding to the second handheld mode, when the wireless handheld device is in the user-interface unlocked state, and the sensor detects that the duration during which the handheld positions of the wireless handheld device match the second handheld mode of the wireless handheld device exceeds the first preset duration, wherein a layout of controls on the third preset user interface is a mirror image of a layout of controls on the fourth preset user interface.

9. The wireless handheld device according to claim 6, wherein the at least one processor is further configured to display the first user interface, when the wireless handheld device is in the user-interface locked state, and the sensor detects that the duration during which the handheld positions of the wireless handheld device match the first handheld mode of the wireless handheld device exceeds the second preset duration.

10. The wireless handheld device according to claim 6, wherein the at least one processor is further configured to display the first user interface, when the wireless handheld device is in the user-interface locked state, and the sensor detects that the duration during which the handheld positions of the wireless handheld device do not match the second handheld mode of the wireless handheld device exceeds the first preset duration.

11. The method of claim 1, wherein the mirror image comprises flip horizontal, and the flip horizontal comprises:

determining that a first control icon is located on a left half of the screen at a first distance from a left edge of the screen and a second distance from a top edge of the screen;

determining that a second control icon is located on the left half of the screen at a third distance from the left edge of the screen and a fourth distance from the top edge of the screen, wherein the first distance is different from the third distance;

translating the first control icon to a right half of the screen to a fifth distance from a right edge of the screen, wherein the first distance is equal to the fifth distance, and wherein the second distance is unchanged; and translating the second control icon to the right half of the screen to a sixth distance from the right edge of the screen, wherein the third distance is equal to the sixth distance, and wherein the second control icon is at the fourth distance from the top edge of the screen.

12. The method of claim 1, wherein the detecting comprises detecting handheld positions of a wireless handheld device using a sensor, wherein a touchscreen is located on a surface of the wireless handheld device and the sensor is located on a different surface of the wireless handheld device.

13. The method of claim 1, wherein the centered axis is parallel to a length of the wireless handheld device and perpendicular to a width of the wireless handheld device, and wherein the length is greater than the width.

14. The method of claim 1, wherein when the wireless handheld device is in a user-interface locked state, the second preset user interface comprises at least two unlocking paths and an application icon, wherein an end of each unlocking path is the unlocking icon or the application icon.

15. The method of claim 14, wherein one end of each unlocking path is the unlocking icon and the other end of each unlocking path is the application icon.

16. The wireless handheld device of claim 6, wherein when the wireless handheld device is in a user-interface locked state, the second preset user interface comprises at least two unlocking paths and an application icon, wherein an end of each unlocking path is the unlocking icon or the application icon.

17. The wireless handheld device of claim 16, wherein one end of each unlocking path is the unlocking icon and the other end of each unlocking path is the application icon.

* * * * *